W. A. WILKINSON & A. H. IRVING.
FRICTION CLUTCH.
APPLICATION FILED NOV. 24, 1909.

978,253.

Patented Dec. 13, 1910.

Witnesses
A. H. Oppahl
H. S. Kilgore

Inventors
William A. Wilkinson
A. H. Irving
By their Attorneys
Williamson & Merchant

UNITED STATES PATENT OFFICE.

WILLIAM A. WILKINSON, OF MINNEAPOLIS, MINNESOTA, AND ADAM HENRY IRVING, OF SPOKANE, WASHINGTON.

FRICTION-CLUTCH.

978,253.　　　Specification of Letters Patent.　　Patented Dec. 13, 1910.

Application filed November 24, 1909. Serial No. 529,664.

*To all whom it may concern:*

Be it known that we, WILLIAM A. WILKINSON and ADAM HENRY IRVING, citizens of the United States, residing, respectively, at Minneapolis, Hennepin county, Minnesota, and Spokane, Spokane county, Washington, have invented certain new and useful Improvements in Friction-Clutches; and we do hereby declare the following to be a full, clear, and exact description of the invention, such as will enable others skilled in the art to which it appertains to make and use the same.

Our invention has for its object to provide an improved friction clutch adapted for use to connect a pulley to a shaft or to connect the abutting ends of two alined shafts, and to this end it consists of the novel devices and combinations of devices hereinafter described and defined in the claims.

In the accompanying drawings, which illustrate the invention, like characters indicate like parts throughout the several views.

Figure 2:
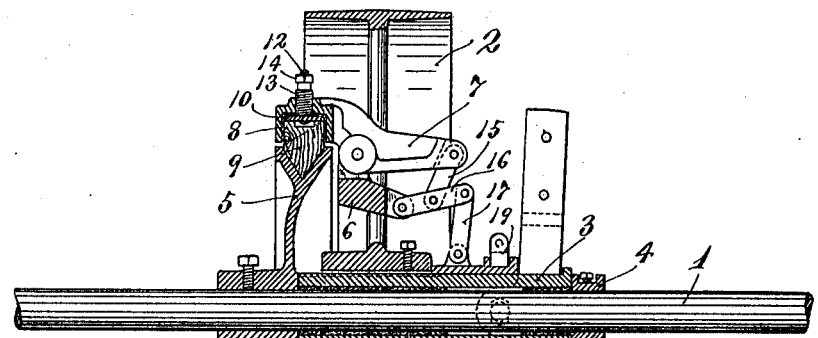
Figure 3:
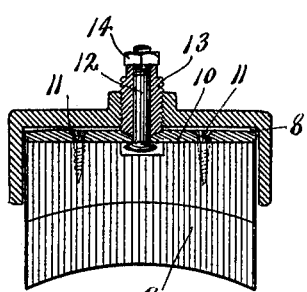
Figure 1:
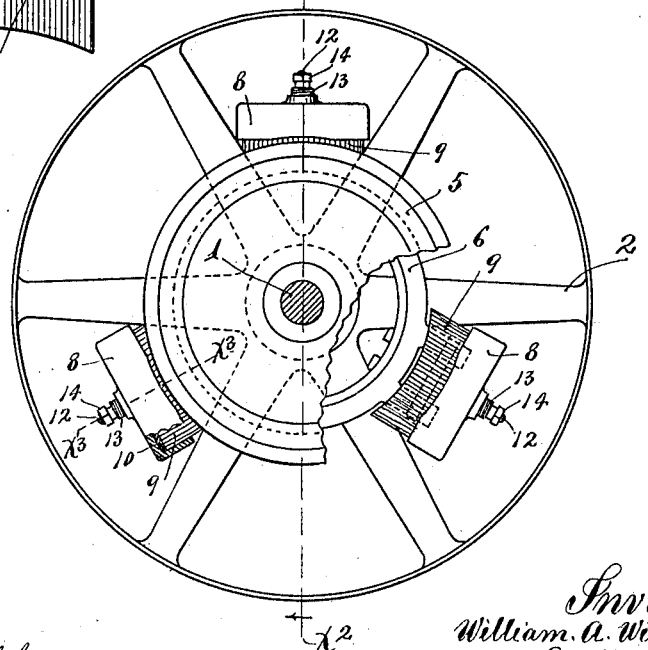

Referring to the drawings, Figure 1 is a view in side elevation, with some parts broken away, showing the improved clutch; Fig. 2 is a vertical section taken on the line $x^2$ $x^2$ of Fig. 1; and Fig. 3 is an enlarged detail in section on the line $x^3$ $x^3$ of Fig. 1.

In the drawings, the clutch is shown as applied to connect a driving pulley to a driven shaft but it will, of course, be understood that it is capable of general use wherever a friction clutch is found serviceable.

The numeral 1 indicates the driven shaft and the numeral 2 the driving pulley. The pulley 2 is rigidly secured to a sleeve 3 journaled on the shaft 1 and held against endwise movements by a collar 4 and by the hub of a clutch wheel 5, and which parts 4 and 5 are rigidly secured by set screws or otherwise to the said shaft. This clutch wheel 5 is provided with a peripheral groove that is V-shaped in cross section.

Formed integral with or otherwise rigidly secured to the spokes of the pulley 2 is a bearing ring 6, to radially projecting lugs of which clutch levers 7 are intermediately pivoted. As shown, there are three of these clutch levers, but the number thereof may, of course, be varied.

At their left hand ends, as viewed in Fig. 2, the clutch levers 7 are provided with transversely elongated pockets 8 in which the outer ends of frictionally acting clutch blocks 9 are seated with freedom for slight lateral and endwise swinging movements. The inwardly projecting edges of these clutch blocks 9 are segmental and V-shaped in cross section, so that they will fit the V-shaped peripheral groove of the clutch wheel 5. To the inner ends of said blocks 9, metal plates 10 are secured, preferably, by means of screws 11. Short bolts 12 are passed through central perforations in the plates 10 but their heads are seated in recesses of the blocks 9, and the stems of these bolts are passed through externally threaded sleeves 13 and are provided with nuts 14 at the outer ends of said sleeves. The said sleeves 13 have screw threaded engagement with the backs or outer portions of the pockets 8 and adjustments of said sleeves serve to move the clutch blocks near to or farther from the clutch wheel, so as to properly set the said blocks in the first place and, thereafter, to take up the wear of the blocks. These blocks, it may be here stated, are preferably made of hard wood, the grain of which runs at a right angle to the coöperating plates 10. The inner ends of the sleeves 13 are rounded and they fit correspondingly concave seats in the plates 10, so that a universal joint is provided permitting the wedge shaped faces of the clutch blocks to be set for proper engagement with the groove in the clutch wheel and, thereafter, to be locked in such position by tightening the nuts 14 on the bolts 12. The said clutch blocks are, therefore, arranged for radial adjustments in the plane of the clutch wheel and for rocking movements in the said plane and transversely of the said plane. These adjustments are all that are ever required to properly set the clutch blocks for initial action and to maintain the same properly set and to compensate for wear of the blocks.

At their right hand ends, as viewed in Fig. 2, the clutch levers 7 are connected by short links 15 to the intermediate portions of short levers 16, the inner ends of which are pivoted to laterally projecting lugs on the bearing ring 6, and the outer ends of which are connected by links 17 to a shipper collar 18, which latter is mounted to slide on the sleeve 3. The shipper collar 18 is provided with a groove in which is seated a non-rotary shipper ring 19 which, at its sides, is pivotally connected to metallic straps 20 of the usual shipper lever, not shown. As is evident, when the shipper collar 18 is moved inward, as shown in Fig. 2, the clutch blocks 9 will be forced tightly against the grooved periphery of the clutch wheel 5 and the pulley 2 will rotate the shaft 1. In this position, it will be noted, by reference to Fig. 2, that the lower ends of the links 17 are moved toward the left slightly beyond their dead centers and, hence, will themselves hold the clutch set. When the clutch sleeve 18 is moved in its extreme position toward the right, the clutch blocks will be released from the grooved periphery of the clutch wheel 5 and the pulley 2 will then rotate freely on the shaft 1 without rotating the latter. It will also be noted that the arrangement of the links 15, 17 and levers 16 are such that the clutch setting force incident to movement of the clutch of the shipper collar 18 toward the lever will be doubled.

The improved clutch described is of comparatively small cost and, in practice, has been found highly efficient for the purposes had in view.

What we claim is:

1. The combination with rotary driving and driven members, of a clutch mechanism comprising a clutch wheel secured to one of said rotary members and having a grooved periphery, a clutch lever pivoted to the other rotary member, connections applied to one end of said lever for moving the same, and a brake shoe to fit the peripheral groove of said clutch wheel and mounted in the other end of said lever with freedom for radial and oscillatory adjustments in the plane of said clutch wheel and in respect to the said lever.

2. The combination with rotary driving and driven members having a common axis, of a clutch wheel secured to one of said members and provided with a V-shaped annular groove in its periphery, a multiplicity of clutch levers intermediately pivoted to the other rotary member, brake shoes having V-shaped segmental faces for engagement with the groove of said clutch wheel, means securing said brake shoes to projecting ends of said levers with freedom for radial and oscillatory adjustments in the plane of said clutch wheel and for oscillatory adjustments transversely of the plane of said clutch wheel, a sleeve mounted to slide in respect to but to rotate with the rotary member to which said levers are pivoted, intermediate levers pivoted to the same rotary member, links connecting the outer ends of said intermediate levers to said sleeve, and links connecting the intermediate portions of said intermediate levers to the outer ends of said clutch levers, substantially as described.

In testimony whereof we affix our signatures in presence of two witnesses.

WILLIAM A. WILKINSON.
ADAM HENRY IRVING.

Witnesses to the signature of William A. Wilkinson:
ALICE V. SWANSON,
HARRY D. KILGORE.

Witnesses to the signature of Adam Henry Irving:
G. M. PEDDYCORD,
GEO. W. BROWN.